Nov. 15, 1949     A. W. HANSON     2,488,189
EXTRUSION MACHINE

Filed Nov. 1, 1946     5 Sheets-Sheet 1

INVENTOR.
Alden W. Hanson
BY
Griswold & Burdick
ATTORNEYS

Nov. 15, 1949 A. W. HANSON 2,488,189
EXTRUSION MACHINE
Filed Nov. 1, 1946 5 Sheets-Sheet 5
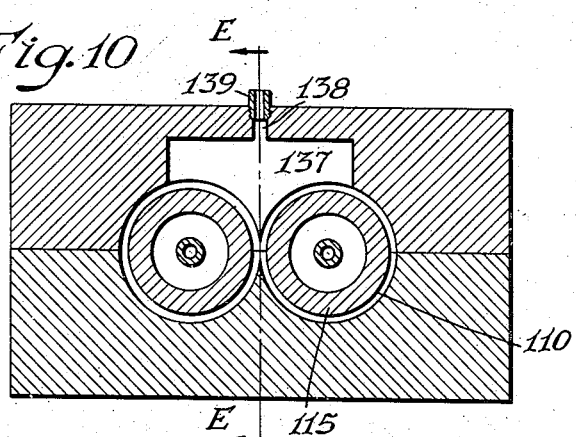
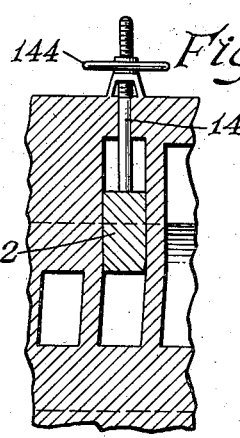
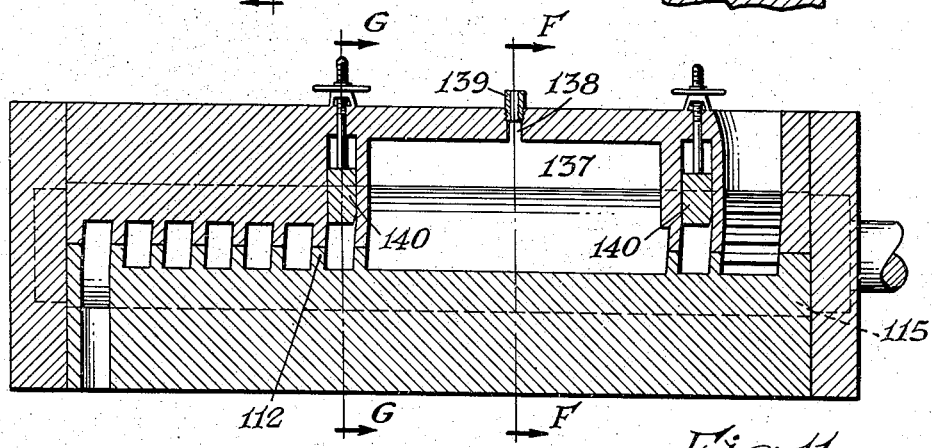
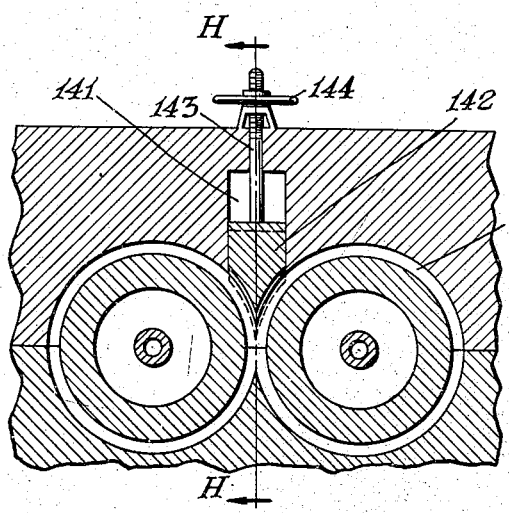
INVENTOR.
Alden W. Hanson
BY
Griswold & Burdick
ATTORNEYS Patented Nov. 15, 1949

2,488,189

UNITED STATES PATENT OFFICE 2,488,189

EXTRUSION MACHINE

Alden W. Hanson, Midland, Mich., assignor to The Dow Chemical Company, Midland, Mich., a corporation of Delaware Application November 1, 1946, Serial No. 707,195

10 Claims. (Cl. 18—12)

The present invention relates to machines for extruding plastic materials. It is more particularly concerned with a machine which is adapted to mix, mill or masticate plastic materials with continuous discharge of the product by extrusion. This application is a continuation-in-part of my prior application, Serial No. 570,949, filed January 1, 1945 now abandoned.

In screw type extruders of the prior art, such as are used for plastic materials like rubber, cellulose acetate, polyvinyl chloride, etc., good blending of added agents with the plastic cannot be obtained. On the other hand, mixing rolls used for blending plastic materials are not adapted for continuous forwarding and discharge of the mixed product by extrusion or otherwise.

It is among the objects of the invention to provide a machine capable of simultaneously milling plastic materials and extruding the same, thereby combining the operations of compounding the plastic and extruding it through a die.

Another object is to provide a machine for milling and compounding plastic materials which is capable of operation with continuous feed and discharge.

Another object is to provide a machine of the aforesaid type adapted for rapid heating or cooling of the material in process.

A further object is to provide a machine adapted for melting, milling and extruding a thermoplastic material in one continuous operation.

Still another object is to provide a machine of the aforesaid type, which is also adapted to remove water or solvent vapors from the plastic mix simultaneously with milling the same, or to incorporate a gas or liquid with the plastic mix.

Other objects and advantages of the invention will appear from the following description taken in connection with the annexed drawing illustrating a preferred embodiment of the invention.

In said drawing:

Fig. 10 is a cross-section of a further modification of the arrangement of Fig. 7, on the line F—F of Fig. 11.

Fig. 11 is a vertical longitudinal section of the modification of Fig. 10, on the line E—E.

Fig. 12 shows in enlarged scale a detail of the modification shown in Figs. 10 and 11, on the line G—G.

Fig. 13 is a section of the detail shown in Fig. 12, on the line H—H.

The machine consists essentially of a pair of juxtaposed rolls having smooth working surfaces, which are rotatably mounted in cylindrical working barrels communicating through a common slotted opening at the pinch of the rolls for the greater part of their length. One, or both, of the barrels is provided with a helical groove in the wall. The rolls and corresponding barrels are substantially parallel axially and adjacent peripherally. The proximate surfaces of the rolls lie in the opening between the barrels, being spaced apart with sufficient clearance for working a plastic material between them. The rolls and barrels are contained in a casing provided with a feed opening adjacent to one end thereof and with a discharge opening or passage adjacent to the other end. Driving means are provided to rotate the rolls, and means may also be provided for heating or cooling the rolls and barrels.

Figure 1:
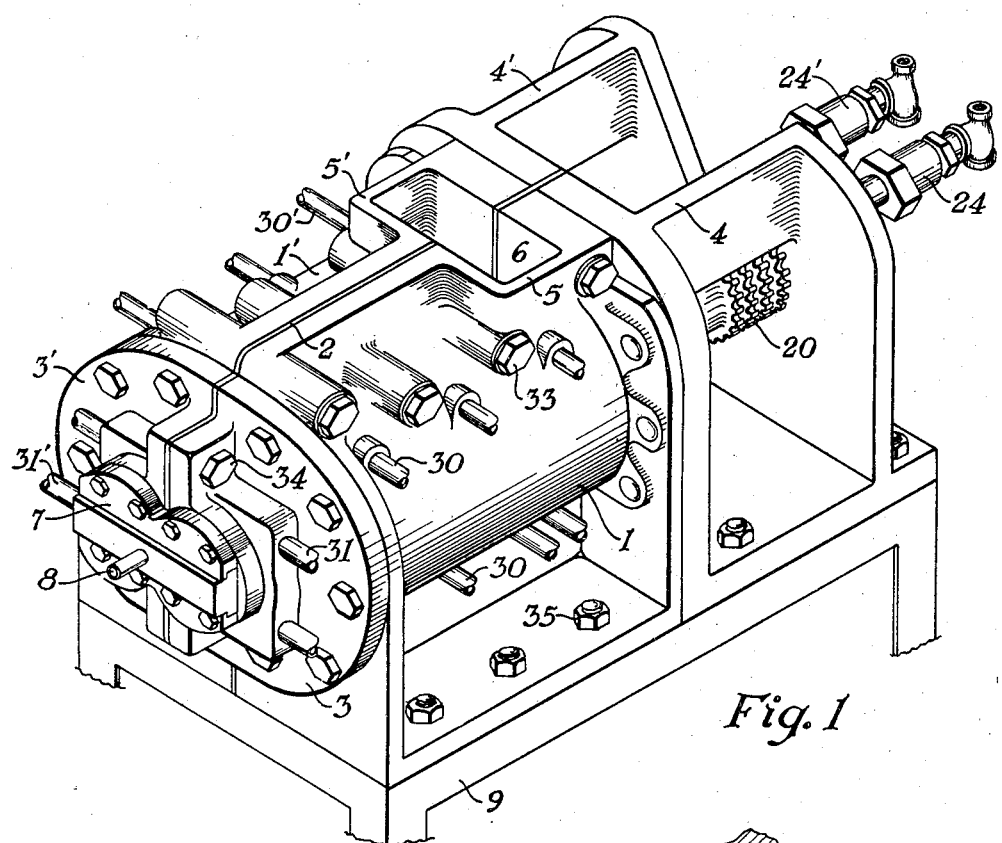
Fig. 1 is an isometric view of the aforesaid machine, showing means for the feed and discharge of materials, and connections for heating or cooling fluids and to a source of power.

Referring to the drawing, Fig. 1, the body of the machine is a casing composed of two similar opposed blocks 1, 1' separated by a narrow spacing plate 2. The ends of the blocks are flanged for attachment to heads 3, 3' at the forward, or discharge, end and to shaft support brackets 4, 4' at the rear, or feed, end. At the top rear portion of each block is a hollow boss 5, 5', the hollow interior spaces of the two bosses being joined through a corresponding slot in plate 2 to form a feed hopper 6. Across heads 3, 3' is secured an adapter or nose-piece 7 carrying extrusion die 8. The assembly is secured to a base 9.

Figure 2:
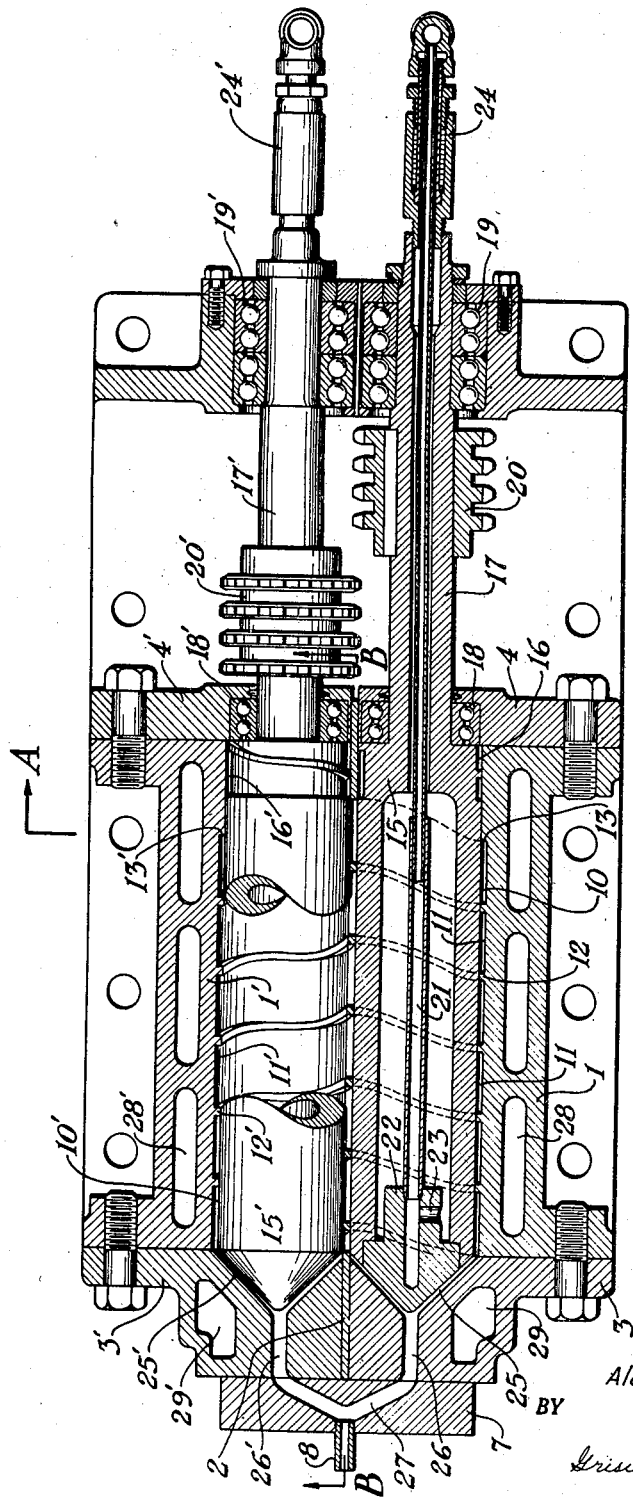
Fig. 2 is a central horizontal section of the machine illustrated in Fig. 1, showing certain parts in view and partly cut away.
Figure 3:
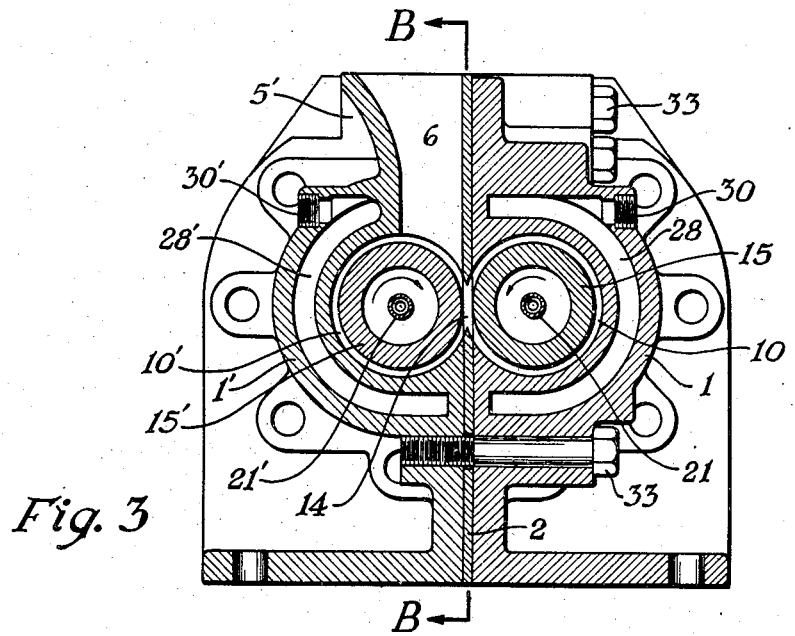
Fig. 3 is a vertical cross-section on line A—A of Fig. 2.
Figure 4:
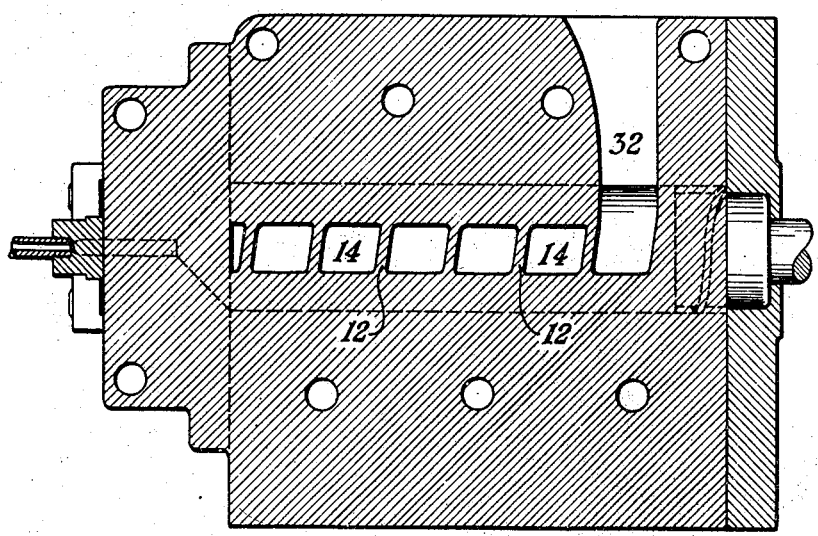
Fig. 4 is a vertical longitudinal section between the rolls on line B—B of Figs. 2 and 3.
Figure 7:
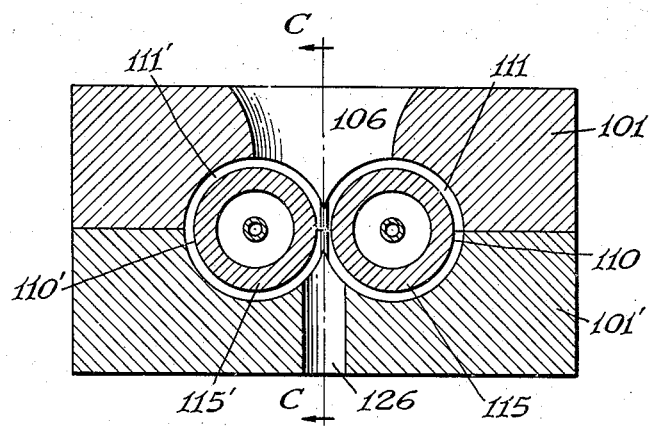
Fig. 7 is a cross-sectional view of a modified arrangement in which the casing is divided horizontally, and showing an alternative form of discharge opening, on the line D—D of Fig. 8.

Figs. 2, 3 and 4 show in detail the interior construction of the assembly shown in Fig. 1. Blocks 1, 1' are bored for barrels 10, 10', which are eccentrically disposed, as shown in Fig. 3, so that the circumference of the bore is approximately tangent to the face of the respective blocks. Spiral grooves 11, 11' are cut in the walls of the barrels, having respectively right and left hand lead. The grooves are preferably wide in proportion to their depth and to the narrow lands 12, 12' separating the adjacent flights, being generated from shoulders 13, 13' near the rear end of the barrels and extending to the forward end thereof. The depth of the grooves is approximately equal to the thickness of plate 2. It is evident that the grooves 11 and 11' cut through the face of blocks 1, 1' and also plate 2, in which their circumferences intersect, causing the grooves to merge and thereby open a row of slots or windows 14 in the common wall between the barrels, separated by the solid lands 12 that bridge the gap between the rolls, as shown in Fig. 4. Communication between the barrels is established through the slots.

Rolls 15, 15' are fitted with running clearance in the respective barrels for rotation therein, extending the full length of the barrels with the conical tip of the rolls protruding beyond the forward end of the barrels. The rolls are smooth, except that the rear end of each roll is provided with a single flight spiral groove 16, 16' of the same hand as the groove in the corresponding barrel, grooves 16, 16' subtending the smooth barrel at the rear of shoulders 13, 13'.

Figure 5:
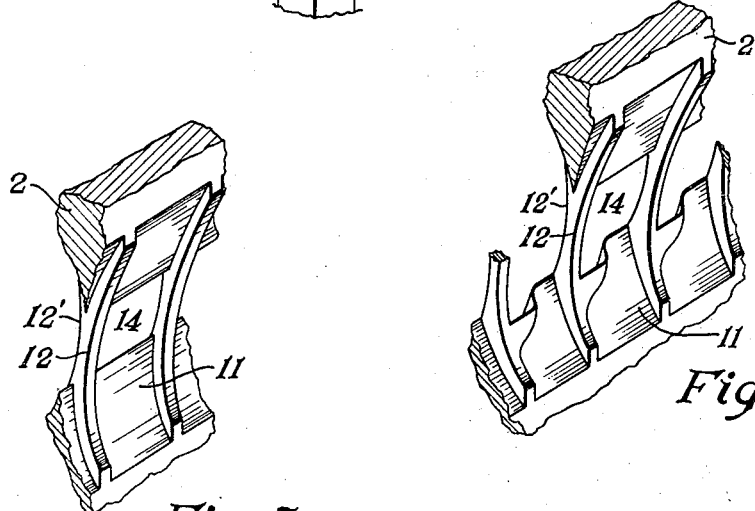
Fig. 5 is a detail, in enlarged scale, of a portion of the structure shown in Figs. 2-4.

Fig. 5 is a broken away section of the common wall between the barrels constituted by plate 2, showing in perspective the detail of one of the slots or windows 14. The corresponding lands 12 and 12' in the respective barrels unite to form a bridge separating the adjacent slots from each other. The height of the slot represents the length of the chord between the intersections of the circumferences at the bottom of the grooves 11, 11'. Since the slot is made by machining the grooves in the respective barrels in the manner above described, the upper and lower edges of the slot are normally straight and sharp, as shown. The sharp edge, however, does not contact the surface of the rolls, but is spaced therefrom by a distance equal to the depth of the groove in the barrel.

Figure 6:
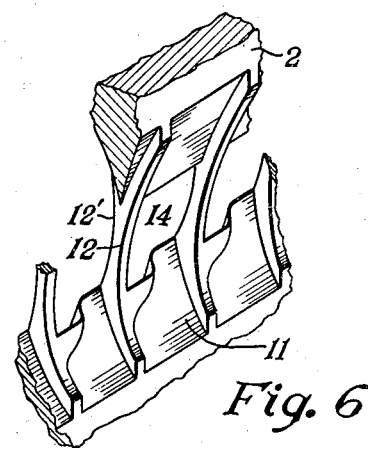
Fig. 6 is a modification of the detail shown in Fig. 5.

A modification of the slots 14 is shown similarly in perspective in Fig. 6, whereby the lower edge of the slot is enabled to scrape the surface of each of the rolls. The bottom of each of the grooves is milled out for one-half of its width, and built up for the other half, just below the slot, so as to form a sharp edge which is offset at the middle, one half of the edge being flush with the land 12 on one side of the slot and the other half being flush with the land 12' on the other side. This permits half of the lower edge of the slot to scrape one roll, and the other half to scrape the other roll.

The rolls have step-down shaft extensions 17, 17' at the rear, which are supported by bearings 18, 18' and 19, 19' carried on brackets 4, 4'. Quadruple sprockets 20, 20' are secured to shafts 17, 17', being offset for clearance, and are to be separately driven by chain drive from a source of power not shown.

The rolls and shafts are hollow, as shown, for circulating a heat transfer fluid. A tube 21 is axially disposed within the hollow shaft and roll, being anchored at the forward end in a nipple 22 having a port 23 therein. The rear end of tube 21 is connected to one chamber of a double-chambered rotary joint 24, 24' having inlet and outlet connections for supplying the heat transfer fluid, such as a Johnson joint, which is secured to the end of the hollow shaft, the annular passage in the shaft connecting with the other chamber of the rotary joint.

The heads 3, 3' secured to the forward end of the blocks contain conical recesses 25, 25' to receive the conical tips of the rolls, leaving a clearance approximately equal to the depth of grooves 11, 11'. Passages 26, 26' lead from the apex of recesses 25, 25' to a connecting channel 27 in adapter 7, which directs the flow from the individual passages to extrusion die 8.

Blocks 1, 1' and heads 3, 3' each have a hollow wall for circulation of a heat transfer fluid in jackets 28, 28' and 29, 29', respectively. Jackets 28, 28' are shown in three sections separated by inner walls without communication between the sections. This is for the purpose of providing three separate temperature zones around the cylinders, if desired, in processing plastic materials therein. Connections 30, 30' and 31, 31' are provided for inlet and outlet of the heat transfer fluid to the jackets 28, 28' and 29, 29', respectively.

Hopper 6 is shown in relation to the other parts by Figs. 3 and 4. It leads directly to the space between the rolls at the rear end thereof for feeding plastic material thereto. It is formed from the re-entrant openings in the bosses 5, 5' which communicate through a slot 32 in plate 2.

The parts of the assembly shown are secured in position by cap-bolts 33, which hold together the blocks 1, 1' and plate 2, and cap-bolts 34 which fasten the heads 3, 3' and brackets 4, 4' to the respective blocks. Stud-bolts 35 hold down the machine on base 9.

The plate 2 interposed between blocks 1, 1' serves various purposes. The thickness of this plate determines the spacing of the rolls 15, 15', hence the spacing can be varied, if desired, by providing interchangeable plates of different thicknesses. The same result can also be had by inserting shims cut in accordance with the pattern shown in Fig. 4. Another purpose of the plate is to enable the bridge portion of the lands 12, 12', which separates the slots 14, to be made in one piece for greater strength, instead of being split as would be the case if the blocks were set directly face to face for boring and grooving, without the use of the spacing plate.

In the operation of the machine described, plastic material is fed into hopper 6, where it falls directly into the nip of the rolls which rotate toward each other, as shown by the arrows, Fig. 3. The rolls rotate at a moderate speed, on the order of 50 to 100 R. P. M. The plastic is squeezed between the rolls and forced ahead in a divided stream along the helical grooves in the barrels. Any tendency of the plastic to be forced backward along the rolls is counteracted by the action of the grooves 16, 16' on the rolls. The frictional resistance of the plastic in traversing the grooves results in mixing and masticating the same as it moves forward. At each flight of the groove the two streams of plastic merge in the space between the rolls at the slots 14, where an intensified mixing action occurs, and the mass is again divided and forced ahead through the next flight of the grooves. By the device of scraping the rolls with the lower edge of the slot 14, in the manner illustrated in Fig. 6, the mixing of the plastic within the slots is further accentuated by stripping half of the plastic ribbon in each groove and directing its flow into the groove of the other cylinder. In the latter case the plastic is caused to travel alternately from one barrel to the other at each flight of the grooves. The pressure exerted on the moving streams of the plastic is cumulative at each revolution, and increases progressively as the plastic travels forward. At the forward end of the rolls the plastic is forced at high pressure through passages 26, 26' and connecting channel 27 to the die 8, where it is extruded in a continuous rod or strip conforming to the shape of the die.

During the working of the plastic the temperature of the mass may be controlled within desired limits by circulating a heating or cooling fluid, as may be required, e. g. air, steam, water or other liquid heat transfer agent, through the jackets 28, 28' in the blocks 1, 1' and jackets 29, 29' in the heads 3, 3', as well as through the hollow rolls 15, 15'. As previously mentioned, jackets 28, 28' may be divided into three or other number of independent chambers, each of which may be maintained at the same or different temperatures according to the nature of the plastic and its mode of treatment. Thus the temperature of the material in process may be held or varied within such range as may be required for any particular plastic. The plastic travels in a continuous ribbon whose thickness is defined by the depth of the spiral grooves, and for handling any particular plastic a suitable depth of groove may be selected to assure a satisfactory heat transfer in the mass. The machine is well adapted for milling and extruding heat-sensitive plastics, such as co-polymers of vinylidene chloride, which are poor heat conductors. Such plastics need to be quickly heated to a sufficient temperature to render them workable, but a high temperature gradient from the heating jacket to the plastic mass must be avoided to prevent local over-heating of the plastic and incipient decomposition of the same.

The rolls may be driven at the same or different speeds in accordance with the mode of treatment to be applied to the plastic. If the operation is chiefly or solely one of extrusion, the rolls are driven at the same speed. When the operation involves mixing and compounding of materials, the rolls may preferably be driven at different speeds. A simple arrangement for driving the rolls is to provide a separate chain drive and motor for each roll, employing such gear reducing and speed changing mechanism as may be required.

The adapter 7, as described herein, is an optional element. If desired, the extruded plastic may be withdrawn directly from the individual rolls, thus providing two extrusions instead of one. The adapter serves as a die block or holder, in which extrusion dies of any desired shape may be set.

Various modifications of the machine are illustrated in Figs. 7–13. An alternative arrangement is shown diagrammatically in Figs. 7 and 8, which is functionally equivalent to the structure of Figs. 1–6, but differently constructed with respect to some of its parts. Here the casing is divided horizontally, being composed of upper block 101 and lower block 101'. The barrels 110, 110' are bored half in the upper block and half in the lower, with spiral grooves 111, 111' in the walls, as before. The rolls 115, 115' are supported at both ends on bearings 118, 118' mounted in heads 103 and 104, respectively. Shaft 117 connects with the driving mechanism. In upper block 101 at one end is feed hopper 106 opening into the space between the rolls. A discharge passage 126 is centrally disposed below the rolls in the lower block 101' at the other end thereof. At the intersections of grooves 111, 111' a single elongated slot 114 is shown, which is formed by cutting out the bridge section of all of the lands between the grooves except the first one, indicated as 112, separating the feed opening from the working section of the rolls. This eliminates a structurally weak projecting member, in the illustrated form of structure, at the expense of some loss of pressure accumulation at the successive flights of the grooves, but such loss is slight in handling viscous or pasty materials of the kind that usually would be processed in this machine. The one bridge section 112 shown acts as a seal between the feed zone and the working zone of the machine. If desired, more than the one bridge section may be retained, to provide a greater sealing effect. In this modified design heating or cooling means may also be provided, as in the manner previously shown, or the equivalent thereof.

Figure 8:
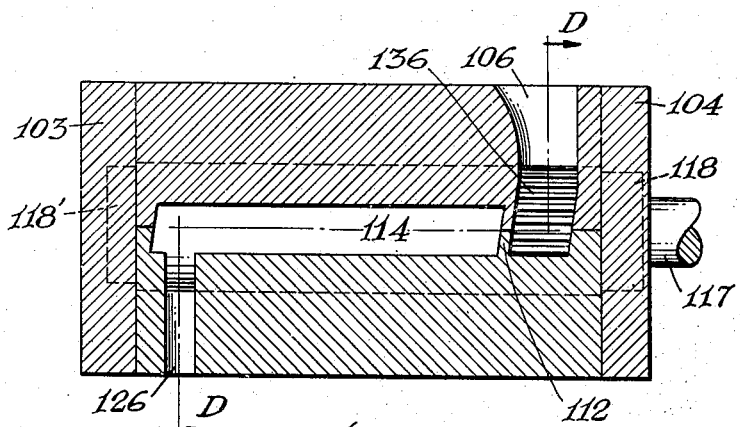
Fig. 8 is a vertical longitudinal section of the modification of Fig. 7, on the line C—C.
Figure 9:
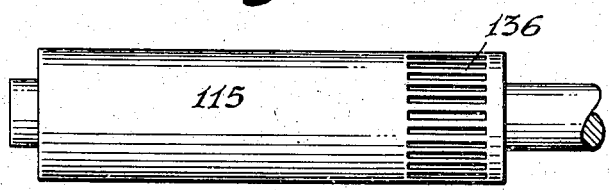
Fig. 9 is a modified form of roll.

Fig. 9 shows in view a roll which is modified by addition of a series of lengthwise grooves or furrows 136 around the periphery of the roll at the feed zone, as indicated in Fig. 8. This is an optional feature, for use when the material to be fed to the machine consists of coarse granules or the like, some of which may be of such size that they tend to ride on the rolls instead of passing between them. The grooves increase the "bite" of the rolls on such coarse feed and improve the feeding rate of the machine with such material. The grooves need not be parallel to the axis of the roll, as shown, but may be angularly disposed with respect to the axis, or even circumferential, or the rolls may be furrowed in other ways opposite the feed opening. A similar result is produced by milling a series of flat strips around the periphery of the roll parallel to the axis. Such means have the effect of intermittently enlarging the clearance between the rolls in the feed zone during rotation thereof to facilitate the feeding of coarse materials thereto.

A further modification is shown in Figs. 10–13, where an expansion chamber is provided above the rolls over a portion of their length. A chamber 137 is recessed in the upper block in open communication with the barrels above the pinch of the rolls for a portion of their length, spaced axially from the feed hopper and from the discharge opening by a distance corresponding to at least one flight of the grooves. A passage 138 leads from the chamber to the outside of the casing, in which is a nipple 139 for connecting to a source of pressure or vacuum. A control valve 140 is provided at or adjacent to each end of chamber 137 for regulating the flow of material into and out of the chamber. Details of the valve are shown in Figs. 12 and 13. A rectangular valve chamber 141 is formed in the block at the junction of the barrels, having a width equal to the width of the groove 111. A slide valve member 142 is fitted with running clearance in chamber 141, having a cross section as in Fig. 12, so that its seating surface conforms to the curvature of the barrel on either side and constitutes a movable section in the bottom of the respective grooves. A valve stem 143 secured to member 142 passes through the block with suitable packing (not shown) and is threaded at its upper end into a rotatable hand-wheel 144. The valve acts as a choke to hold back the flow of material in groove 111, when required. Its travel is limited to the depth of the groove. When in "open" position the member 142 is flush with the bottom of the groove. When it is operated, it is advanced into the groove, as shown by dotted lines in Fig. 12.

A function of the expansion chamber is to permit escape of gas or vapor, if such should be released from the plastic during processing. Thus, if the plastic mass contains moisture or other volatile substance, such as residual solvent or unpolymerized monomer, the vapors released by heating the material during working are vented from the chamber or drawn off by applying suction thereto. Similarly, if it is desired to incorporate a gas or liquid into the plastic during working, such gas or liquid may be forced into the chamber under pressure and thus brought into intimate contact with the plastic while it is being worked between the rolls.

When the expansion chamber is provided, the working space in the machine may be considered as being divided into three zones, (a) a feeding zone, (b) an absorption or desorption zone, and (c) a pressurizing and discharge zone. As shown in Fig. 11, the bridging lands 112, which separate the slots 114 between the rolls, are omitted in zone b, but are retained in zone c. Such arrangement, of course, is optional, and may be varied, as desired. In the modification shown by Figs. 10–13, heating or cooling means may be provided for the rolls and working barrels, as previously described.

Various modifications and arrangements of the structural parts, as shown herein, may obviously be made by those skilled in the art without departing from the principle of the invention. In special adaptations of the invention for working particular plastics the selection of details will be made which is deemed to be most suitable for the properties of the plastic and the type of processing to be applied to it. Design details may be varied, as desired, such as the pitch, width and depth of the helical grooves in the barrels, the width of the lands, the length and diameter of the rolls, etc. For example, without implying any limitation, the pitch of the helical grooves may be from 1 to 4 inches, and the depth from 1/8 to 3/8 inch. Likewise, the diameter of the rolls may be from 4 to 12 inches, and the length from 16 to 60 inches, or more. The pitch of the grooves may be uniform, or it may be progressively increasing or diminishing, and the depth of the grooves may also be uniform or varying, as desired. For some purposes it may be sufficient to put the spiral groove in only one of the pair of working barrels, leaving the other barrel smooth. The rolls and barrels may be conical as well as cylindrical. If conical, their proximate walls would be parallel, and axes converging. Multiple pairs of rolls may be set in a single casing.

The machine, as described, is adapted to the working of the greatest variety of plastic materials, such as thermoplastic resins, natural and synthetic rubbers, plastic clay masses, creams, pastes, and the like. It is also adapted to handle different kinds of feed stock, ranging from molding granules to plastic masses of any consistency capable of being worked on rolls. It may be used for compounding plastics with colors, fillers, plasticizers or other additive materials, in which case the mixing, compounding, masticating, and extrusion may be carried out as one continuous operation, if desired. When provided with an expansion chamber, as described, it can also be used for drying plastic masses containing moisture or other volatile material in conjunction with working and extruding the same. Numerous and various applications of the invention to the working of plastic materials of the greatest diversity will readily occur to those familiar with the art.

I claim:

1. A machine for mixing, milling and extruding plastic materials comprising the combination of a casing, a pair of peripherally adjacent working barrels in the casing having a common wall therebetween, a rotatably mounted roll in each barrel, an internal spiral groove in at least one of the barrels, through which material being processed is advanced by action of the rolls, and a slotted opening in the common wall between the barrels at the pinch of the rolls.

2. A machine for mixing and extruding plastic materials comprising the combination of a pair of juxtaposed cylindrical chambers or barrels having a common side-wall, said chambers communicating through an opening in the common side-wall, a cylindrical roll rotatably mounted in each chamber with running clearance, a feed inlet to said chambers adjacent to one end thereof, a discharge outlet therefrom longitudinally spaced from said feed inlet, an internal spiral groove in the walls of said chambers advancing from the feed inlet to the discharge outlet, and means for rotating the rolls.

3. A machine for mixing, milling and extruding plastic materials comprising a casing, a pair of peripherally adjacent working barrels in the casing having a common wall therebetween, a rotatably mounted cylindrical roll in each barrel, a slotted opening in the common wall between the barrels at the pinch of the rolls, means for feeding plastic material between said rolls adjacent to one end thereof, means to discharge worked material from the rolls at a location remote from said feeding means, and an internal spiral groove in each of said barrels through which material being worked between the rolls is advanced by action of the rolls from said feeding means to said discharge means.

4. In a machine as claimed in claim 2, means for heating or cooling the rolls and working barrels.

5. In a machine as claimed in claim 2, means on the surface of the rolls opposite the feeding means for intermittently enlarging the clearance between the rolls during rotation thereof.

6. A machine as claimed in claim 2, wherein the spiral grooves are wide in proportion to the pitch, leaving a narrow land between adjacent flights of the grooves.

7. A machine as claimed in claim 2, wherein an expansion chamber is recessed into the casing above the pinch of the rolls and opposite to a portion of the working surfaces thereof, said chamber being spaced from the feeding means and from the discharge means by a distance at least equal to one flight of the spiral grooves.

8. A machine of the character described comprising the combination of a casing, a pair of peripherally adjacent parallel working barrels in the casing having a common wall therebetween, a rotatably mounted roll in each barrel, an internal spiral groove in each barrel, said grooves intersecting at each flight in the common wall between the barrels to form a row of slots through which communication is established between the barrels at the pinch of the rolls, means to feed plastic material between said rolls adjacent to one end thereof, and means to discharge worked material adjacent to the other end thereof.

9. A machine of the character described comprising the combination of a casing, a pair of peripherally adjacent parallel working barrels in the casing, a rotatably mounted roll in each barrel, an internal spiral groove in each barrel, slotted openings between the barrels at the pinch of the rolls, means to feed plastic material between said rolls adjacent to one end thereof, means to discharge worked material adjacent to the other end thereof, an expansion chamber above the rolls and in open communication with the barrels for a portion of their length, said chamber being spaced axially from said feeding means and from said discharge means by a distance at least equal to one flight of the spiral grooves, and a passage leading from said chamber to the outside of the casing.

10. A machine as claimed in claim 8, wherein valve means are provided adjacent to each end of said chamber for controlling the flow of process material into and out of said chamber.

ALDEN W. HANSON.

REFERENCES CITED

The following references are of record in the file of this patent:

UNITED STATES PATENTS

| Number | Name | Date |
|---|---|---|
| 1,533,191 | Kaiser et al. | Apr. 14, 1925 |
| 1,935,050 | Gordon | Nov. 14, 1933 |
| 2,048,286 | Pease | July 21, 1936 |
| 2,242,364 | Montanari | May 20, 1941 |
| 2,367,394 | Griffiths | Jan. 16, 1945 |

FOREIGN PATENTS

| Number | Country | Date |
|---|---|---|
| 180,638 | Great Britain | 1922 |

Certificate of Correction

November 15, 1949

Patent No. 2,488,189

ALDEN W. HANSON

It is hereby certified that errors appear in the printed specification of the above numbered patent requiring correction as follows:

Column 8, lines 47, 50, 54 and 58, for the claim reference numeral "2" read *3*; column 9, line 21, for "claim 8" read *claim 9*;

and that the said Letters Patent should be read with these corrections therein that the same may conform to the record of the case in the Patent Office.

Signed and sealed this 25th day of April, A. D. 1950.

[SEAL]

THOMAS F. MURPHY,
*Assistant Commissioner of Patents.*